United States Patent
Zyskind et al.

(10) Patent No.: US 10,455,115 B2
(45) Date of Patent: Oct. 22, 2019

(54) ADAPTIVE STYLUS POSITION INTERPOLATION

(71) Applicant: Microsoft Technology Licensing, LLC, Redmond, WA (US)

(72) Inventors: Amir Zyskind, Natanya (IL); Jonathan Westhues, Portland, OR (US); Ilan Geller, Pardesiyya (IL); On Haran, Kfar Saba (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 63 days.

(21) Appl. No.: 15/599,918

(22) Filed: May 19, 2017

(65) Prior Publication Data
US 2018/0338065 A1    Nov. 22, 2018

(51) Int. Cl.
| | | |
|---|---|---|
| *H04N 1/393* | (2006.01) | |
| *G06T 3/00* | (2006.01) | |
| *G06F 3/0354* | (2013.01) | |
| *G06K 9/00* | (2006.01) | |
| *G06K 9/22* | (2006.01) | |
| *G06F 3/0488* | (2013.01) | |
| *G06F 3/044* | (2006.01) | |

(52) U.S. Cl.
CPC ....... *H04N 1/3935* (2013.01); *G06F 3/03545* (2013.01); *G06F 3/04883* (2013.01); *G06K 9/00416* (2013.01); *G06K 9/222* (2013.01); *G06T 3/0056* (2013.01); *G06F 3/044* (2013.01)

(58) Field of Classification Search
CPC ... G06F 3/03545; G06F 3/044; G06T 3/0056; H04N 1/3935
See application file for complete search history.

(56) References Cited

U.S. PATENT DOCUMENTS

| | | |
|---|---|---|
| 5,333,209 A | 7/1994 | Sinden et al. |
| 5,511,135 A | 4/1996 | Rhyne et al. |
| 6,256,410 B1 | 7/2001 | Nathan et al. |
| 6,289,124 B1 | 9/2001 | Okamoto |
| 6,839,464 B2 | 1/2005 | Hawkins et al. |
| 7,269,531 B2 | 9/2007 | Brouhon |
| 9,218,071 B2 | 12/2015 | Westhues |

(Continued)

OTHER PUBLICATIONS

Egger, Markus, "Code Magazine: Ink Recognition and Ink Analysis", http://www.codemag.com/Article/0512042, Published on: 1993, 26 pages.

(Continued)

*Primary Examiner* — Muhammad N Edun
(74) *Attorney, Agent, or Firm* — Holzer Patel Drennan

(57) ABSTRACT

The presently disclosed technology uses predefined handwriting characteristics to create and/or refine a stylus position interpolation function over time to provide more accurate and adaptive renderings of the user's handwriting on a touch screen. As the presently disclosed technology is performed on a specific device and uses data collected from one or more specific users, it adapts the stylus position interpolation function for any device-specific or user-specific variations. Further, as the stylus position interpolation function adapts iteratively over time, it may not converge and continues to adapt as the device ages, the user's habits change, or identify of the user changes, and environmental conditions of the device change.

18 Claims, 5 Drawing Sheets

(56) References Cited

U.S. PATENT DOCUMENTS

| | | | |
|---|---|---|---|
| 2004/0113895 A1 | 6/2004 | Lubarsky et al. | |
| 2008/0106520 A1 | 5/2008 | Free et al. | |
| 2010/0321328 A1 | 12/2010 | Chang et al. | |
| 2012/0062497 A1 | 3/2012 | Rebeschi et al. | |
| 2013/0106716 A1* | 5/2013 | Sundara-Rajan | G06F 3/0416 345/173 |
| 2013/0147809 A1 | 6/2013 | Luo et al. | |
| 2013/0278550 A1 | 10/2013 | Westhues | |
| 2014/0253482 A1* | 9/2014 | Toyoura | G06F 3/0418 345/173 |
| 2014/0267104 A1 | 9/2014 | Ahmed et al. | |
| 2015/0370407 A1 | 12/2015 | Beguin et al. | |

OTHER PUBLICATIONS

"International Search Report and Written Opinion Issued in PCT Application No. PCT/US18/028772", dated Jul. 3, 2018, 14 Pages.

* cited by examiner

“Abcdefg” in FIG. 1) that form the original handwriting 102, which is digitally reproduced (or rendered) as shown in FIG. 1.
ADAPTIVE STYLUS POSITION INTERPOLATION

BACKGROUND

Touch-sensitive systems detect and respond to one or more points of contact with a touch-sensitive surface. For example, a touch-sensitive system may be incorporated within an electronic device in the form of a touch screen display that allows a user to both view and manipulate objects using one or more inputs that contact the touch screen.

An electrostatic stylus may be used to create the points of contact with the touch screen and continuous contact with the touch screen and movement over time may form a stroke of the stylus. The stylus may include a body that is the approximate size of a pen or pencil (e.g., around 150 mm in length and around 10 mm in diameter) and may include an electrically conductive electrode at or within its tip. In some implementations, the tip is not electrically conductive (e.g., a plastic-coated metallic tip). The tip is placed in contact with the touch screen, which includes a matrix of conductors (e.g., an array of conductors arranged in rows and columns, forming a two-dimensional array of row-column intersections, or a two-dimensional array of individual square sensor electrodes) to track movement of the electrostatic stylus tip and reproduce points of contact with the touch screen digitally onto the touch screen.

Some touch-sensitive systems may determine whether the stylus is touching a particular location in the matrix by measuring a capacitance from conductors physically close to the location of the electrically conductive tip of the stylus. As the stylus is moved across the touch screen, different conductors are used to track the physical location of the stylus. However, artifacts, errors, or anomalies may be introduced into the digitally reproduced stroke. Systems and methods for identifying and compensating for such anomalies would improve the quality of the digitally reproduced stroke.

SUMMARY

Implementations described and claimed herein may provide a computing system comprising a touch screen, a stylus, and a stylus position interpolation module. The stylus position interpolation module is configured to execute a stylus position function to render a user's stroke of the stylus on the touch screen, detect one or more anomalies in the rendered stroke of the stylus, adapt the stylus position function to smooth the one or more detected anomalies, and execute the adapted stylus position function to render a subsequent stroke of the stylus on the touch screen.

Other implementations are also described and recited herein. This Summary is provided to introduce a selection of concepts in a simplified form that are further described below in the Detailed Descriptions. This Summary is not intended to identify key features or essential features of the claimed subject matter, nor is it intended to be used to limit the scope of the claimed subject matter.

BRIEF DESCRIPTIONS OF THE DRAWINGS

DETAILED DESCRIPTIONS

Prior touch-sensitive systems may use a physical calibration machine that measures capacitance values and maps the measured values to known physical locations of a stylus with reference to a touch screen. This collected data is used to build a training set and a stylus position function for the touch screen. However, these systems are expensive and time-consuming to operate. Due to time and cost limitations, such systems are often only used on a representative sample of the corresponding devices, and the resulting data is applied to all such devices, and they often only address a small area of the touch screen. Manufacturing variances may introduce artifacts specific to each device, which may not be adequately addressed by calibrating a representative sample and applying the resulting data to all such devices. Still further, stylus electrical characteristics (e.g., transmitter voltage and/or frequency), tip shape, and tip size may vary, as well as the user's hand shape, size, and style of writing; none of which may be adequately addressed by calibrating a representative sample and applying the resulting data to all such devices.

The presently disclosed technology uses predefined handwriting characteristics to create and/or refine a stylus position interpolation function over time to provide more accurate and adaptive renderings of the user's handwriting on a touch screen. As the presently disclosed technology is performed on a specific device and uses data collected from one or more specific users, it adapts the stylus position interpolation function for any device-specific or user-specific variations. Further, as the stylus position interpolation function adapts iteratively over time, it may continue to adapt as the device ages, the user's habits change, the identity of the user changes, and environmental conditions (e.g., temperature, pressure, and humidity) of the device change.

Figure 1:
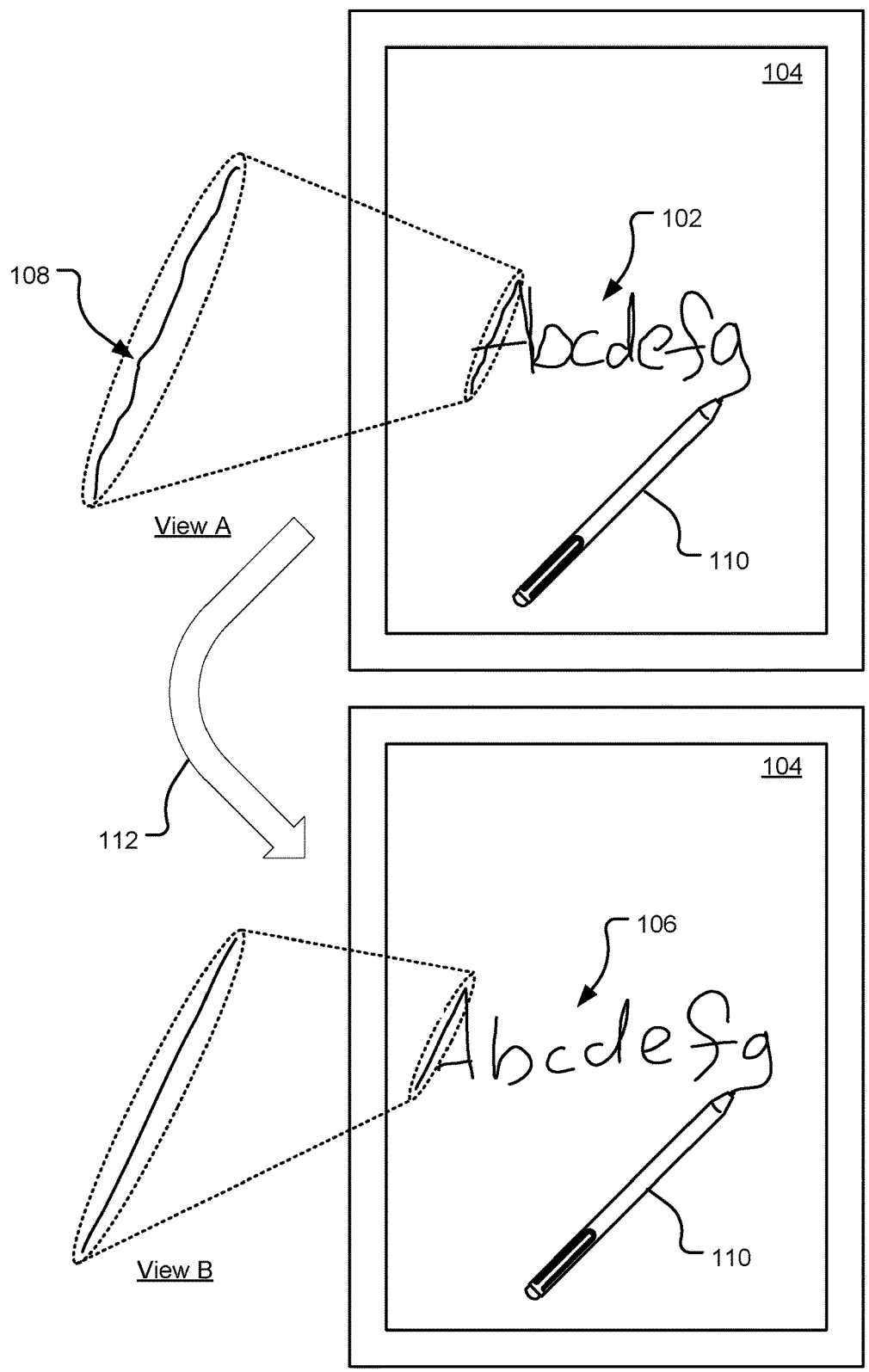
FIG. 1 illustrates example original rendered handwriting on a touch screen as compared to subsequently rendered handwriting on the touch screen that has been conditioned by one or more detected anomalies in the original handwriting.

FIG. 1 illustrates example original rendered handwriting 102 on a touch screen 104 as compared to subsequent rendered handwriting 106 on the touch screen 104 that has been conditioned by one or more detected anomalies (e.g., anomaly 108) in the original handwriting 102. A user (not shown) may use stylus 110 to create the original handwriting 102 on the touch screen 104 by touching the stylus 110 to the touch screen 104 and dragging an electrode tip of the stylus 110 across the touch screen 104. The user traces letters (i.e., "Abcdefg" in FIG. 1) that form the original handwriting 102, which is digitally reproduced (or rendered) as shown in FIG. 1.

The digitally reproduced original handwriting 102 contains one or more detected anomalies (e.g., anomaly 108 illustrated in expanded View A). In various implementations, one or more assumptions are made regarding overall smoothness of the user's stroke of the stylus 110 on the touch screen 104 and deviations from the predefined stroke smoothness may be characterized as anomalies, rather than true reproductions of the user's stroke of the stylus 110. For example, the original handwriting 102 may contain the regularly repeating abrupt discontinuity or anomaly 108 that affects the smoothness of the original handwriting 102. Both the abruptness (e.g., magnitude) and the regular repeating manner (e.g., frequency) of the anomaly 108 suggests that it is not user-generated, but instead an error in a stylus position function rendering the original handwriting 102 on the touch screen 104. For example, the original handwriting 102 may be modeled by a limited number of cubic or other Bezier curve pieces, with first, second, or higher derivative continuity at transitions between pieces. This may enforce a certain level of smoothness on subsequent handwriting 106. The original handwriting 102 may also be modeled using other heuristics for smoothness, or using machine learning algorithms that identify characteristics of a large training set of handwriting recorded on a digitizer with very low position error.

In some implementations, detected irregularities (i.e., potential anomalies) in the original handwriting 102 are compared against a database defining predetermined user handwriting characteristics and/or input into a machine learning algorithm that adapts the stylus position function. The user's stroke of the stylus 110 is compared against the predetermined user handwriting characteristics to define edits to the stylus position function for future handwriting. More specifically, irregularities that meet a predefined threshold or possess a certain feature that indicates they are not likely user errors are classified as anomalies and are used for adapting the stylus position function.

The adapted stylus position function is then used to create the subsequent handwriting 106 and apply smoothing corrections to the entire subsequent handwriting 106. In various implementations, the adapted stylus position function makes relatively small corrections to large lengths of the trace and large corrections to relatively small lengths of the trace. In some implementations, the user's own handwriting is used exclusively or in combination with other users' handwriting in creating the database defining typical user handwriting characteristics.

At a point later in time from the rendering of the original handwriting 102, the user again uses the stylus 110 to create the subsequent handwriting 106 on the touch screen 104 by again touching the stylus 110 to the touch screen 104 and dragging the stylus 110 across the touch screen 104. The user again traces "Abcdefg" that forms the subsequent handwriting 106, which is digitally reproduced as shown in FIG. 1. Arrow 112 illustrates that subsequent handwriting 106 is rendered at a point later in time from original handwriting 102.

The digitally reproduced subsequent handwriting 106 contains fewer or no detected anomalies (e.g., see expanded View B, which is substantially smoother than View A). The adapted stylus position function is used to render subsequent handwriting 106 and additional subsequent-in-time handwriting. If additional anomalies are detected in the subsequent handwriting 106, the stylus position function may be further adapted to remove those anomalies.

The stylus 110 may, but need not, be in physical contact with the touch screen 104 to "touch" the touch screen 104. Rather, the stylus 110 need only be in such physical proximity to the touch screen 104 to impart a change in capacitance within an associated matrix of conductors below the touch screen 104. As such, references to "touch" or "contact" herein need not require direct physical contact but rather more generally requires that the stylus 110 engage the matrix of conductors (e.g., by being in direct physical contact or in close physical proximity to the matrix of conductors, such as by hovering within, for example, 10 mm of the matrix of conductors) such that a change in capacitance is imparted at a position on the matrix of conductors by the stylus 110. The change in capacitance can then be measured to determine the existence and location of the touch.

In an example implementation, the original handwriting 102 depicts a reported position of the stylus 110 produced through use of an original stylus position function that is sensitive to both the translation of the stylus 110 and the angle of the stylus 110 with reference to the touch screen 104. The stylus position function uses curve fitting techniques described herein to create the rendered original handwriting 102. The rendered original handwriting 102 produced using the original stylus position function exhibits undesirable extra curves or wiggles as compared to the rendered subsequent handwriting 106 produced using the adapted stylus position function. As such, to minimize visual defects caused by changes in stylus translation, angle, or other factors, the stylus position function is adapted over time to mitigate detected anomalies.

In various implementations, the touch screen 104 may be associated with a tablet computer, laptop computer, personal computer, gaming device, smart phone, or any other discrete computing device that carries out one or more specific sets of arithmetic and/or logical operations. Further, while the stylus 110 is often the approximate size and shape of a pen or pencil, the stylus 110 could be any convenient size and shape for the user to manipulate to create the handwriting 102, 106 on the touch screen 104. In some implementations, the user's finger may be used in lieu of the stylus 110.

Figure 2:
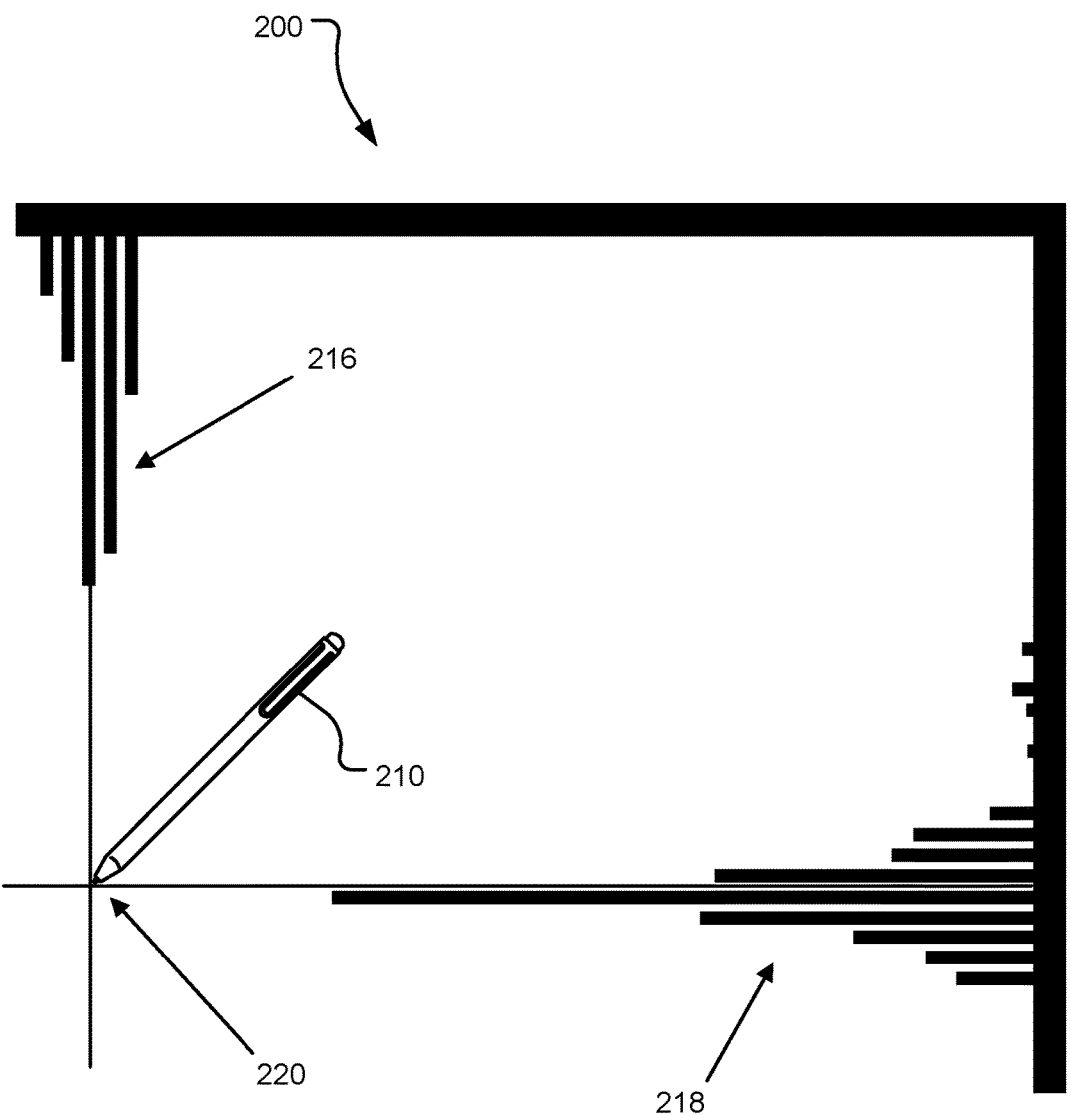
FIG. 2 illustrates measured capacitances for rows and columns of a sensor matrix for a touch screen incorporating a stylus position interpolation module.

FIG. 2 is a diagram 200 illustrating measured capacitances for rows and columns of a sensor matrix for a touch screen incorporating a stylus position interpolation module. Capacitances 216 from a stylus 210 tip electrode to each column electrode and capacitances 218 from the stylus 210 tip electrode to each row electrode are plotted along the top and right edges, respectively, of the diagram 200. A general reported position of the stylus 210 is close to the row and column corresponding to the maximum capacitance along each axis. An interpolation of the reported capacitance data defines the exact reported position 220 of the stylus 210 in "x" and "y" coordinates.

In various implementations, a stylus position interpolation module (not shown, see e.g., module 336 of FIG. 3) receives the measured capacitances from the matrix of conductors and outputs a interpolated reported stylus position (i.e., the location where the stylus 210 touches the sensor matrix). The measured capacitances may then be digitally reproduced as the user moves the stylus 210 over time, as shown in FIG. 1. In various implementations, the stylus 210 utilizes in-cell technology to define a two-dimensional grid of "sensing pixels," each of which is individually terminated (e.g., a horizontal extent of sensor pitch units (H) and a vertical extent of sensor pitch units (V), which in combination is H*V electrode termination points) or out-cell technology (H+V electrode termination points) as illustrated in FIG. 2.

Accuracy of the reported position 220 may be improved by decreasing the pitch of the row and column electrodes. However, this typically increases the number of electrodes, which can increase the amount of circuitry and interconnects within the touch screen. Increasing the amount of circuitry and interconnects, however, may result in an undesirable increase in cost or measurement time.

Nevertheless, increasing the accuracy of the reported stylus position 220 to be significantly greater than the sensor pitch is often desirable. For example, a typical finger touch sensor may have a pitch around 6 mm, which may have been determined from the size of a human fingertip, and the necessity of interpolating the position of an object around that size. In contrast, a typical liquid crystal display (LCD) may have pixels on a pitch around 0.5 mm. In general, it may be straightforward to compute the interpolated position of a finger with high resolution, because the fingertip is large compared to the sensor pitch. It may be difficult to compute the interpolated position of the stylus 210 with comparable resolution, because the stylus 210 tip is small compared to the sensor pitch. Despite that, it may often be desirable to report the stylus 210 position with an accuracy on the order of the LCD pixel pitch (or, more generally, the display pixel pitch) when using touch sensors that are more directed to detecting fingers and, therefore, that have a relatively coarse sensor pitch of around 6 mm. To compute a more accurate estimate of the stylus 210 position without an undesirable increase in cost and/or measurement time, the estimated position may be interpolated as a continuous function of the measured capacitances.

An initial interpolation function may be determined empirically by using a test apparatus (not shown) to enable measurement of capacitances corresponding to different known true positions of the stylus 210 and determining an interpolation function from the measured data using curve fitting, such as, for example, by using a "linear least squares" fit. Notably, the term "true position" is used herein to denote the actual location where the stylus 210 touches the sensor matrix, as contrasted with the "reported position" 220 of the stylus 210, which is the position that corresponds to the touch sensor's best estimate of the stylus 210 true position based on the measured capacitance data and is the position that is reported for use by higher level processes or applications that perform operations based on stylus 210 position information. In some implementations, the reported position 220 of the stylus 210 is the estimated position produced by evaluating the interpolation function. In other implementations, the reported position 220 is the estimated position produced by evaluating the interpolation function after that estimated position has been further modified by additional processing or filtering (e.g., temporal averaging to reduce the effects of noise). In still other implementations, the interpolation function may vary based on a detected region, area, or quadrant of the touch screen that is in use.

A curve fit analysis may be simplified by leveraging known symmetries of capacitance measurements within the touch sensor, by recognizing that only capacitances from the stylus 210 electrode tip to rows and columns very close to the stylus 210 electrode tip may contain useful information, and by assuming no cross-axis sensitivities, which is an assumption that has been found to introduce acceptably small errors in the estimated positions produced by the resulting interpolation function. Additionally, the curve fit analysis may be further modified to produce an interpolation function that is less sensitive to noise by incorporating penalties in the analysis that are proportional to the non-smoothness (or differential non-linearity) of the interpolation function and/or incorporating penalties that seek to minimize the sum of the squares of the partial derivatives of the interpolation function with respect to each input variable.

An angle of the stylus 210 with respect to the sensor matrix may significantly impact the measured capacitances, and, therefore, the curve fit analysis may be further adjusted to account for the angle of the stylus 210. Specifically, the curve fit analysis may incorporate angle offset variables that are also minimized as part of the analysis but that are discarded and not used in the determined interpolation function. Use of these angle offset variables in the curve fit analysis may significantly decrease the noise sensitivity of the estimated positions produced by the interpolation function in practice but also may introduce an offset in the estimated position that is relatively static with respect to changes in the true position of the stylus 210 but that changes as the angle of the stylus 210 with respect to the sensor matrix changes.

In practice, the angle of the stylus 210 changes relatively slowly compared to the changes in the true position of the stylus 210. For example, a user holding the stylus 210 like a pen changes the position of the stylus 210 in his hand relatively slowly compared to the changes in position of the tip of the stylus 210 on the touch sensor as the user interacts with the touch sensor using the stylus 210 to "write" on the sensor matrix. Thus, in practical systems, the resulting offset in the reported stylus position 220 when using an interpolation function that takes into account the angle of the stylus 210 is typically much more visually acceptable to a user of the touch sensor than the much more rapidly and dramatically varying changes in the reported stylus position 220 produced by an interpolation function that is more susceptible to noise because it fails to take into account the angle of the stylus 210. Moreover, in practice, the resulting stylus angle-sensitive static offset produced by the disclosed interpolation function is typically small (e.g., on the order of a few millimeters), making it even more visually acceptable to a user.

In some implementations, two interpolation functions are used to provide an improved estimate of the true position of the stylus 210. The first interpolation function is determined from an analysis that takes into account the angle of the stylus 210 with respect to the sensor matrix, and the second interpolation function is determined from an analysis that does not take into account the angle of the stylus 210. Notably, the first interpolation function produces an estimated position that is desirably less susceptible to noise, but that introduces a static offset that is dependent on the angle of the stylus 210. The second interpolation function, in contrast, produces an estimated position that is more susceptible to noise but that does not include a static offset and, therefore, on average and over time, will more closely correspond to the true position of the stylus 210. In one sensor frame, for example, measured capacitance data for the frame can be inputted into the first and second interpolation functions to produce a first estimated position and a second estimated position, respectively, for the stylus 210 in the sensor frame. An improved estimate of the true position of the stylus 210 in the sensor frame can then be obtained by taking the first estimated position generated by the first interpolation function and adjusting the first estimated position by, for example, an average historic difference between the first and second estimated positions for a predetermined number of prior sensor frames.

Figure 3:
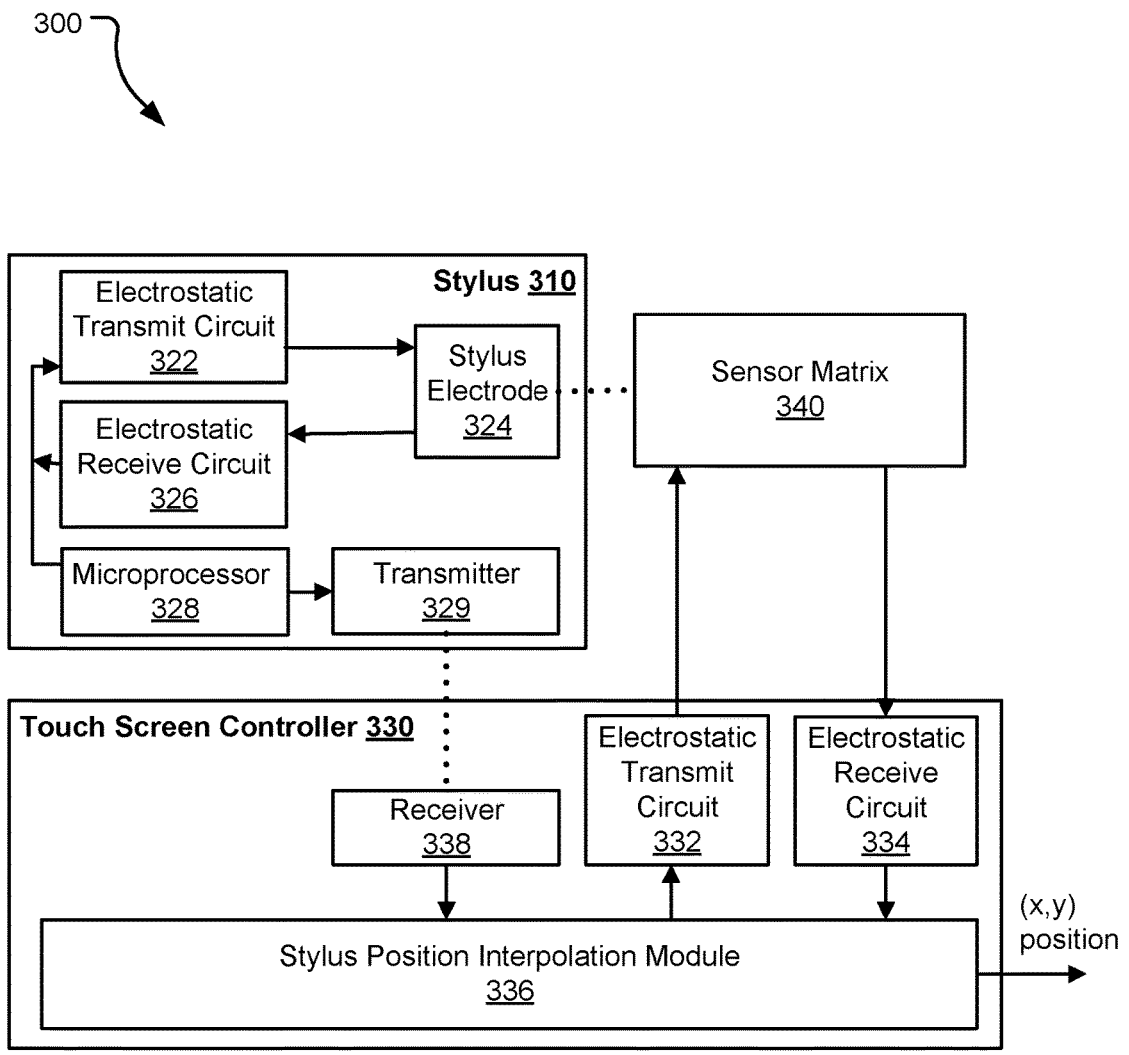
FIG. 3 illustrates a circuit diagram of a touch sensor system that uses adaptive stylus position interpolation to create a reported position of a stylus based on an earlier reported position of the stylus.

FIG. 3 illustrates a circuit diagram of a touch sensor system 300 that uses adaptive stylus position interpolation to create a reported position of a stylus 310 based on an earlier reported position of the stylus 310. The touch sensor system 300 uses an interpolation algorithm that was determined from curve fitting measured capacitance data to estimate a location of the stylus 310 touching a touch screen (not shown, see e.g., touch screen 104 of FIG. 1). The touch sensor system 300 is a capacitive touch sensor system having a sensor matrix 340 incorporated into a display device to create the touch screen. The touch sensor system 300 is a particular implementation of a touch sensor system that is able to leverage the improved interpolation techniques described herein. However, it should be understood that system 300 is merely exemplary and that other touch sensor systems that do not include a touch screen (e.g., instead include a separate display and a touch pad) and/or that detect touches through a mechanism other than changes in capacitance also may advantageously leverage the described improved interpolation techniques to provide a more accurate reported position for the stylus 310.

The sensor matrix 340 may include a first array of conductors arranged substantially parallel with one another and a second array of conductors arranged substantially parallel with one another. In some implementations, the conductors in the first array may be positioned substantially perpendicular to the conductors in the second array to form the matrix. While the conductors in the first array may be referred to as rows or row electrodes, and the conductors in the second array may be referred to as columns or column electrodes, the designation of the two arrays as rows/row electrodes vs. columns/column electrodes is generally arbitrary such that the designation may be reversed with no change in meaning. The sensor matrix 340 may have a sensor pitch (i.e., a distance between two adjacent rows or columns in the sensor matrix) of, for example, 6 mm. In various implementations, the sensor matrix 340 may utilize in-cell technology to define a two-dimensional grid of "sensing pixels" (H×V termination points) or out-cell technology (H+V termination points) as illustrated in FIG. 2 and described in detail above.

Because the sensor matrix 340 is being used in front of or within a display (e.g., an LCD, not shown), the sensor matrix 340 may be substantially transparent to visible wavelengths of light. Specifically, the conductors in the matrix 340 may be made from transparent conductive material (for example, indium tin oxide), or, alternatively, may be made from opaque material, but with traces so small as to be inconspicuous (e.g., the conductors may be metal wires 10 µm or less in diameter). In other implementations, the system 300 is not a touch screen system and the sensor matrix 340 is not positioned within, in front or behind a display but rather is positioned within a touch pad distinct from the display of the system 300. The sensor matrix 340 may be similar or identical to a sensor matrix used to detect the presence of the user's finger touches, for example by measuring the capacitance from each row to each column, or by measuring the capacitance from each row and each column to ground. As such, the sensor matrix 340 may be used to measure both the position of a user's finger touches and the position of the stylus 310.

In some implementations, the conductors in the first and second arrays of the sensor matrix 340 may intersect each other such that every row conductor intersects every column conductor but does so at an angle that is not perpendicular, thereby providing a sensor having the form of a parallelogram. In other implementations, the conductors in the first and the second arrays of the sensor matrix 340 may instead form a more complex pattern, in which any two rows (or any two columns) are not necessarily parallel, or not necessarily laid out along straight lines. This may be desired for cosmetic reasons. For example, if the sensor electrodes are made using opaque metal, then moiré patterns against the spatial structure of the LCD may be more objectionable when the sensor electrodes are approximately parallel to the rows and columns of the LCD pixels than when they are rotated by some angle. The disclosed interpolation techniques, however, apply regardless of whether the rows and columns of the sensor matrix 340 intersect at right angles, at a different angle, or in a more complicated way.

The stylus 310 may include an electrostatic transmit circuit 322 for transmitting an electrical signal to the sensor matrix 340 through a stylus electrode 324 and may further include an electrostatic receive circuit 326 for receiving an electrical signal from the sensor matrix 340 through the stylus electrode 324. In some implementations, the stylus 310 has a body approximately the size and shape of a pen or pencil (e.g., around 140 mm and around 10 mm in diameter) having a tip containing the stylus electrode 324.

The tip of the stylus 310 may be made of electrically conductive material (e.g., metal wire or foil, or machined from solid metal stock). In some implementations, the stylus 310 may be designed with a tapered tip to permit a user to select small on-screen objects without excessively occluding them. In these implementations, the stylus electrode 324 fits within the taper of that tip. For example, the stylus electrode 324 may have the form of a cone with that taper, or a cone with steeper taper, or a thin metal wire, or any other shape fitting within that volume. The shape of the stylus electrode 324 may be rotationally symmetric about the axis of the stylus 310, to make the reported position of the stylus 310 insensitive to twist about that axis. In other implementations, the stylus electrode 324 may be deliberately designed to be rotationally asymmetric, if the system 300 seeks to measure that twist.

The transmit circuit 322 and the receive circuit 326 may be, for example, analog circuitry wired to the stylus electrode 324. In one implementation, the transmit circuit 322 is configured to transmit a voltage to the conductors of the sensor matrix 340 electrostatically by applying a time-varying voltage to the tip of the stylus 310. The receive circuit 326 is configured to receive and measure a time-varying current from the conductors of the sensor matrix 340 electrostatically by maintaining the tip at a constant (i.e., a non-time-varying) voltage and measuring the current to the tip. A microprocessor 328 inside the stylus 310 may sequence these operations, and use a wireless transmitter or transceiver 329 (e.g., a 2.4 GHz radio transmitter or transceiver) inside the stylus 310 to wirelessly communicate with a touch screen controller 330. In other implementations, the stylus 310 may instead use a wired communication path to communicate with the touch screen controller 330. In some implementations, the stylus 310 may omit one or more of the transmit circuit 322, the receive circuit 326, the microprocessor 328, and the transmitter or transceiver 329 and may instead rely on a wired connection and/or corresponding circuitry in the touch screen controller 330.

The touch screen controller 330 may include an electrostatic transmit circuit 332, an electrostatic receive circuit 334, a stylus position interpolation module 336, and a wireless receiver or transceiver 338. The transmit circuit 332 and the receive circuit 334 may include electronics wired directly to the row and column conductors (also referred to as electrodes) of the sensor matrix 340 to electrostatically transmit and receive electric signals, respectively, to and from the conductors in the sensor matrix 340. In in-cell implementations of the presently disclosed technology, the transmitter or transceiver 329 and the electrostatic receive circuit 334 may be omitted.

The stylus position interpolation module 336 in the touch screen controller 330 sequences the transmit and receive operations of the electrostatic transmit circuit 332 and receive circuit 334 and determine, from the received signals, capacitances from the stylus electrode 324 to the row and column electrodes of the sensor matrix 340. The stylus position interpolation module 336 may be configured to communicate with the stylus 310 by using the wireless receiver or transceiver 338 to coordinate the transmit and receive operations of the circuits 332, 334 with the transmit and receive operations of the stylus 310. The stylus position interpolation module 336 may determine capacitance values from the electronic signals received from the sensor matrix 340, and may relay capacitance values received using the wireless receiver or transceiver 338, and may evaluate an interpolation function using the capacitance values to arrive at an estimated position of the stylus 310 with reference to the sensor matrix 340.

Specifically, to determine the location of the stylus 310, the system 300 may measure the capacitance from each row and each column of the sensor matrix 340 to the tip of the stylus 310. For a given row or column, the capacitance may be large when the stylus 310 is close to the row or column and may be small when the stylus 310 is far from the row or column. In some implementations, the stylus position interpolation module 336 (or the microprocessor 328) may instruct the stylus 310 to apply a time-varying voltage from the stylus electrode 324 to system ground. The electrostatic receive circuit 334 of the touch screen controller 330 may hold each row and each column of the sensor matrix 340 at a constant DC voltage with respect to the system ground and may measure the resulting time-varying current into each row and each column under the direction of the stylus position interpolation module 336. The measured currents may be proportional to the capacitances under test, for example.

In some of these implementations, the stylus 310 may be connected to the touch screen controller 330 by a wire such that the time-varying voltage may be applied to the stylus electrode 324 by circuitry included in the touch screen controller 330 that is referenced to a common system ground. However, in implementations like that shown in FIG. 3 where the stylus 310 is wirelessly connected to the touch screen controller 330, the stylus 310 may contain circuitry (e.g., the transmit circuit 322) configured to apply the time-varying voltage, and the stylus 310 may connect to ground through another electrode (not shown) on the stylus 310. The other electrode on the stylus 310, which is hereinafter referred to as the stylus ground electrode, may be large, and positioned so that the user contacts the stylus ground electrode (or couples capacitively to the stylus ground electrode with a capacitance much larger than the capacitance under test) when the user holds the stylus 310. Alternatively, the stylus ground electrode may be positioned and sized such that stray capacitances from the stylus ground electrode to nearby grounded conductors of the sensor matrix 340 are much larger than the capacitances under test (e.g., capacitances to the metal casing of a monitor containing the sensor matrix 340 and a display; or capacitances to the rows and columns of the display itself, which are at AC ground, although such capacitances also contribute error).

Other implementations of the system 300 may measure the capacitances in a manner that is different from those described above. Regardless of how the capacitances are measured, the stylus position interpolation module 336 of the system 300 uses all or a subset of the measured capacitances to evaluate an interpolation function and provide, as an output, (x, y) coordinates of a reported position of the stylus 310.

Figure 4:
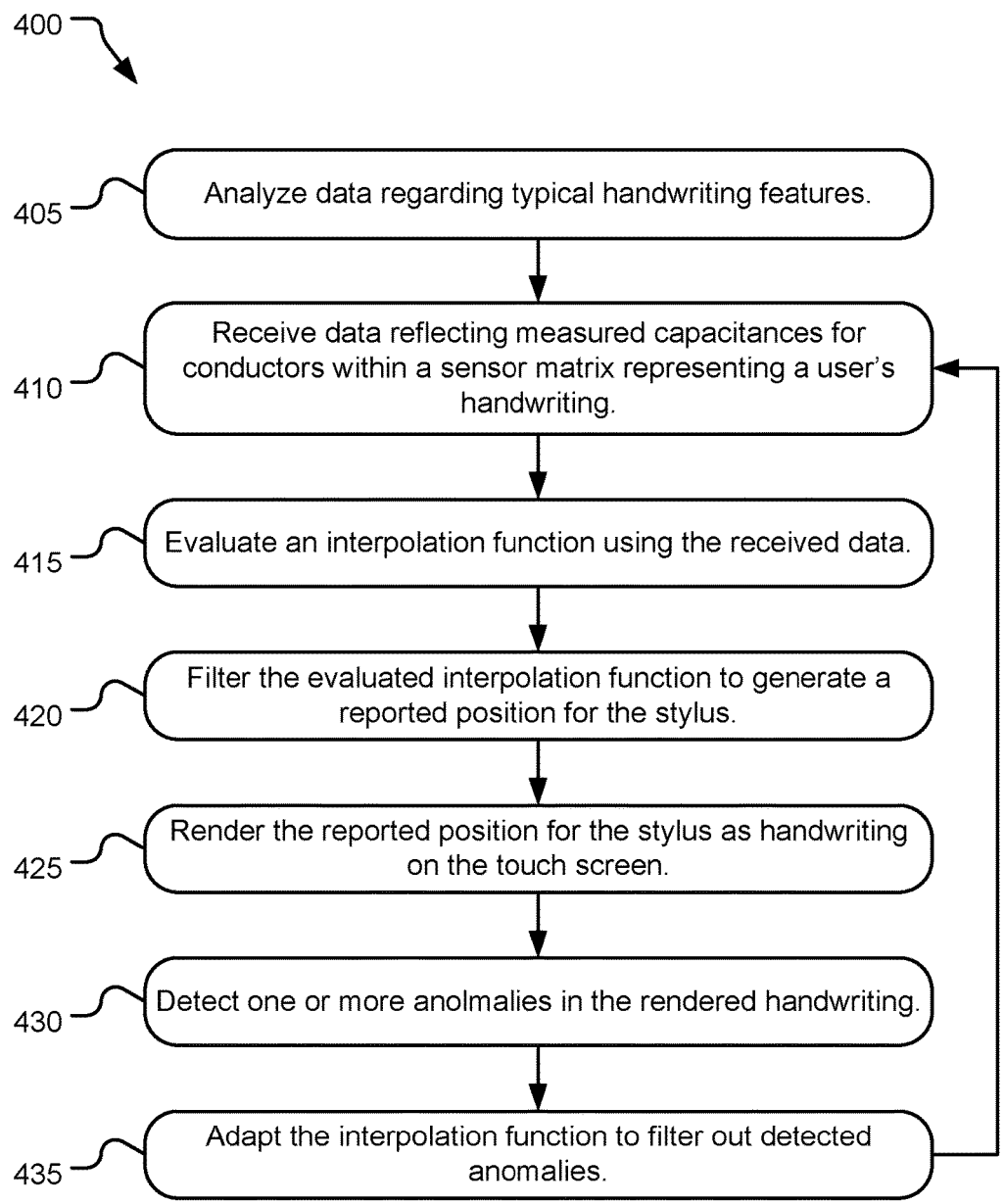
FIG. 4 illustrates example operations for using adaptive stylus position interpolation to create a reported position of a stylus based on an earlier reported position of the stylus.

FIG. 4 illustrates example operations 400 for using adaptive stylus position interpolation to create a reported position of a stylus based on an earlier reported position of the stylus. The following operations 400 may be performed using the stylus position interpolation module 336 of the system 300 that is described with reference to FIG. 3. However, the process 400 may be performed by other computer systems or system configurations (e.g., processing system 500 of FIG. 5.

An analyzing operation 405 collects and analyzes data regarding typical handwriting features, which may be generic to a pool of users or specific to a user. For example, the handwriting data may define that a user's handwriting may exhibit a minimum predefined stroke smoothness. Any deviations from the predefined stroke smoothness are not likely due to the user's hand movement but rather an anomaly in the interpolation function. Further, the handwriting data may define that a user is unlikely to exhibit any regular and repeated deviations within a range of spatial frequencies corresponding to sensor matrix electrode pitch and/or outside a certain magnitude window. Any such regular and repeated deviations are not likely due to the user's hand movement but rather another anomaly in the interpolation function.

In some implementations, the analyzing operation 405 is dependent upon an active application on an associated device. For example, if the user is actively using Microsoft Word or another word processing program, the analyzing operation 405 may assume the user is tracing letters and words and will perform the analyzing operation 405 by comparing the user's strokes to typical handwriting features, as discussed above. In another example, if the user is actively using Microsoft Visio or another illustration program, the analyzing operation 405 may assume the user is tracing geometric shapes (e.g., circles, squares, or more complex shapes) and will perform the analyzing operation 405 by comparing the user's strokes to typical hand drawn features (e.g., typical circles, rectangles, etc.).

In an example implementation, the analyzing operation 405 collects data regarding the typical handwriting features (e.g., a training set) from a large pool of users (e.g., a pool of previous users and fixed in time or a pool of active users that changes over time). In an implementation where the data is previously collected from a pool of previous users, the analyzing operation 405 may be performed upon commissioning of an associated device, or at least prior to any of the other operations 400. In an implementation where the data is collected from active users over time, the analyzing operation 405 may be performed multiple times over a lifespan of the associated device, each time refining what is considered an anomaly in the user's handwriting.

A receiving operation 410 receives or otherwise accesses data reflecting measured capacitances for conductors within a sensor matrix representing a user's handwriting. The measured capacitances reflect a relative location of the stylus with reference to the sensor matrix, which may be embedded in a touch screen. The set of data may reflect some or all measured capacitances deemed to be useful for the following evaluation operation 415. Specifically, the set of data may only include capacitance data for a row having the maximum measured row capacitance and a small number of its nearest neighbor rows (e.g., a total of four rows, including two rows on either side of a peak capacitance), and capacitance data for a column having the maximum measured column capacitance and a small number of its nearest neighbor columns.

An evaluation operation 415 evaluates an interpolation function using the received data. For example, when the interpolation function is a weighted sum of basis functions, the stylus position interpolation module may access, from a data store, one or more coefficients of the basis functions. The basis functions may be, for example, multivariate cubic polynomials of the type described in further detail below. The stylus position interpolation module may input the received data into a resulting polynomial function to generate a preliminary estimate of the stylus's true position. In some implementations, the stylus position interpolation module evaluates multiple different interpolation functions for each axis of the sensor matrix to produce multiple different estimates that are then combined to provide an improved estimate of the true position of the stylus along each axis of the sensor matrix.

In various implementations, the interpolation function is iteratively refined via repeated instances of the adapting operation 435 discussed in detail below. Each time the evaluation operation 415 is performed, it uses the latest variation of the interpolation function to most effectively estimate the true position of the stylus. In some implementations, the evaluation operation 415 is also performed on previously rendered and saved handwriting to refine its visual representation on the touch screen should the user retrieve it. In various implementations, performing the evaluation operation 415 on previously rendered and saved handwriting occurs gradually as device resources permit.

A filtering operation 420 filters or otherwise further processes the preliminary estimate of the stylus's true position provided by the evaluation operation 415 to generate a reported position for the stylus that may be used to render the position on the touch screen, or be passed to higher-level application software for further processing. The processing or filtering of the preliminary estimate may, for example, include reducing the effects of temporal noise by temporal averaging of the preliminary estimate with the preliminary estimates or reported positions generated in a predetermined number of previous sensor frames (e.g., one or two frames when the stylus is moving quickly, or tens of frames when the stylus is moving slowly, for typical frame rates of approximately 100 Hz).

For example, the filtering operation 420 may compute an arithmetic mean position over a specified number of past frames, and thus report a moving average of the interpolated position of the stylus. The filtering operation 420 may also compute a weighted arithmetic mean position, where those weights may be considered as the coefficients of a finite impulse response (FIR) filter, and those weights may be chosen to achieve a desired tradeoff between smoothness and latency of a rendered stroke of the stylus. The filtering operation 420 may achieve a similar result at lower computational cost using an infinite impulse response (IIR) filter, for example using a first-order IIR low-pass filter to compute an exponentially-weighted moving average. More sophisticated techniques may consider the noise, speed, acceleration, and other characteristics of the stylus position to better trade smoothness against latency, in some cases even predicting a future stylus position to simulate negative latency.

A rendering operation 425 renders the reported position for the stylus as handwriting on the touch screen in real time (or with minimal delay) as the user moves the stylus with reference to the touch screen. In an example implementation, the user traces handwriting with the stylus across the touch screen, and the user's handwriting is rendered on the touch screen in real time.

A detecting operation 430 detects one or more anomalies present in the handwriting rendered in operation 425. The detecting operation 430 compares the handwriting rendered in operation 425 to any rules regarding typical handwriting features defined in analyzing operation 405. Any such anomalies are not likely true representations of the stylus position.

An adapting operation 435 adapts one or more coefficients of the interpolation function, or the interpolation function itself, to filter out the anomalies detected in operation 430. Operations 410-435 iteratively repeat as the user traces additional strokes on the touch screen, and the interpolation function is adapted to filter out any detected anomalies. In some implementations, the analyzing operation 405 also iteratively repeats as additional data regarding typical handwriting features is collected and analyzed. In some implementations, iteration of operations 410-435 may occur until sufficient data is collected and the adapting operation 435 consistently performs little to no changes in the interpolation function. At that point in time, the interpolation function is fixed for further use. In other implementations, iteration of operations 410-435 may occur continuously or periodically throughout the life of the device. In various implementations, correction limits (also referred to herein as interpolation limits) are applied to the adapting operation 435 to prevent the adapting operation 435 from overshooting correction of a detected anomaly or becoming stuck in a divergent correcting loop, for example.

In some implementations, the adapting operation 435 occurs after rendering operation 425, but prior to subsequent renderings. In other words, the adapting operation 435 is performed off-line in an effort to perform the rendering operation 425 with little to no delay from a point in time where the user physically traces a stroke on the touch screen. In other implementations, the associated computing device has sufficient computing resources to perform the adapting operation 435 and repeat the evaluating and/or filtering operations 415, 420 prior to the rendering operation 425 in real-time to refine each stroke based on any detected anomalies within that same stroke with little or no delay. In still further implementations, the adapting operation 435 occurs after the rendering operation 425. However, a further rendering operation refines the image of the user's handwriting on the touch screen as the adapting operation 435 is performed and the evaluating and/or filtering operations 415, 420 are repeated.

Figure 5:
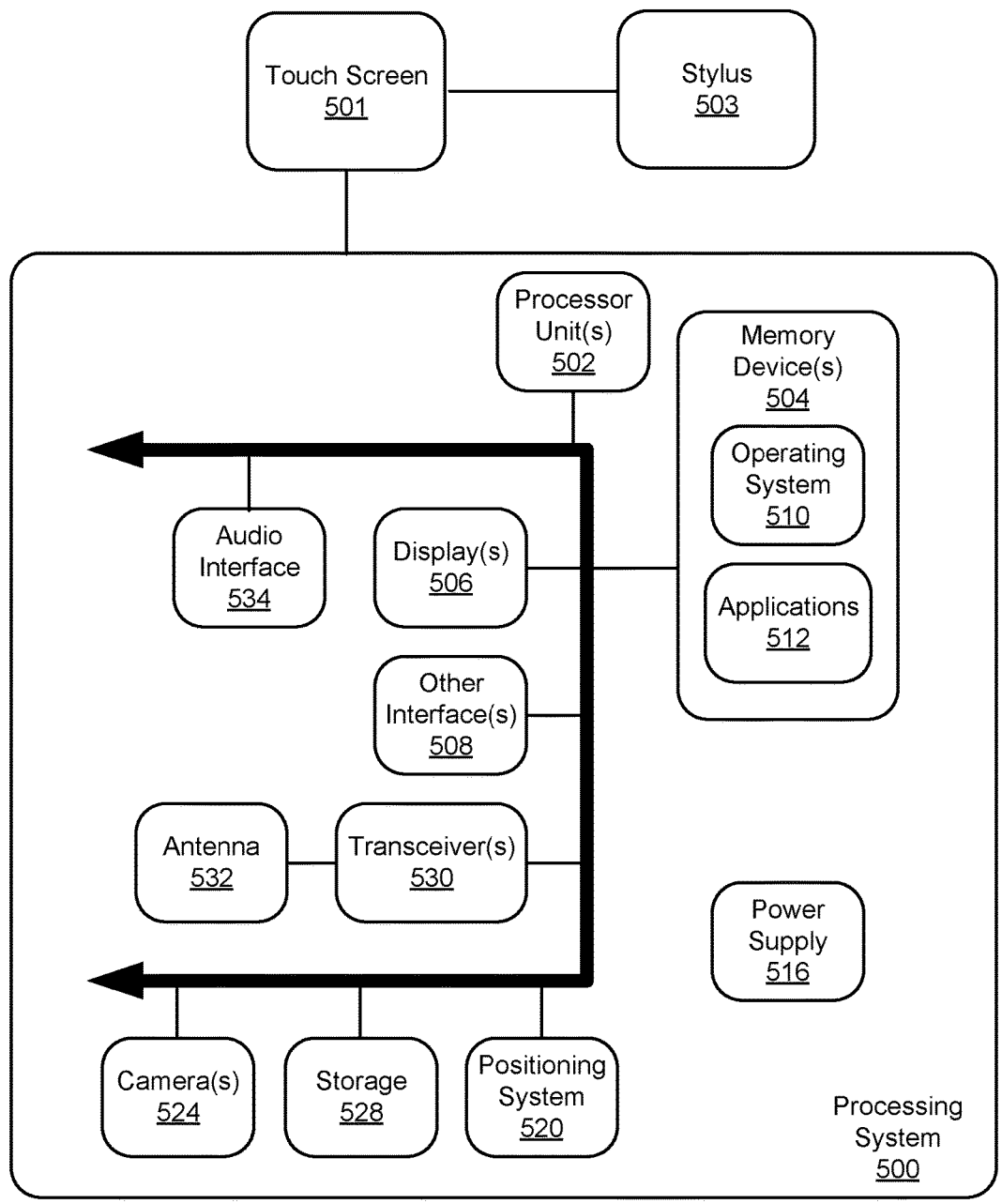
FIG. 5 illustrates an example processing system for using adaptive stylus position interpolation to create a reported position of a stylus based on an earlier reported position of the stylus.

FIG. 5 illustrates an example processing system 500 for using adaptive stylus position interpolation to create a reported position of a stylus 503 based on an earlier reported position of the stylus 503 with reference to a touch screen 501. Some or all of the components of the processing system 500 described in detail below may be located remotely from the touch screen 501 and the stylus 503 in cloud-based implementations of the presently disclosed technology.

The processing system 500 may include one or more processor units 502 (e.g., discrete or integrated microelectronic chips and/or separate but integrated processor cores), at least one memory device 504 (which may be integrated into systems or chips of the processing system 500), one or more displays 506 (e.g., a touch screen display, an organic light-emitting diode (OLED) display with photodetectors, etc.), and other interfaces 508 (e.g., keyboard and/or touchpad interfaces). The memory device(s) 504 may include one or both of volatile memory (e.g., RAM) and non-volatile memory (e.g., flash memory). An operating system 510, such as one of the varieties of the Microsoft Windows® operating system, resides in the memory device(s) 504 and is executed by at least one of the processor units 502, although other operating systems may be employed.

One or more applications 512 (e.g., a stylus position interpolation application) are loaded in the memory device(s) 504 and executed on the operating system 510 by at least one of the processor units 502. The processing system 500 includes a power supply 516, which is powered by one or more batteries and/or other power sources, and which provides power to other components of the processing system 500. The power supply 516 may also be connected to an external power source that overrides or recharges the built-in batteries or other power sources.

The processing system 500 may still further include one or more communication transceivers 530 to provide network connectivity (e.g., mobile phone network, Wi-Fi®, BlueTooth®, etc.), a positioning system 520 (e.g., a global positioning satellite transceiver), audio interface(s) 534 (e.g., a microphone or headphone jack), one or more cameras 524, one or more antennas 532, and additional storage 528. Other configurations may also be employed.

In an example implementation, the processing system 500 receives reported stylus position data from the touch screen 501 and/or the stylus 503 and executes an interpolation function to render the reported stylus position on the touch screen 501. The processing system 500 further evaluates the reported stylus position to determine if it contains any anomalies. If anomalies are detected, the processing system adapts the interpolation function to filter out the detected anomalies in future uses of the stylus.

The processing system 500 may include a variety of tangible processor-readable storage media and intangible processor-readable communication signals. Tangible processor-readable storage can be embodied by any available media that can be accessed by the processing system 500 and includes both volatile and nonvolatile storage media, as well as removable and non-removable storage media. Tangible processor-readable storage media excludes intangible communications signals and includes volatile and nonvolatile, removable and non-removable storage media implemented in any method or technology for storage of information such as process-readable instructions, data structures, program modules or other data. Tangible processor-readable storage media includes, but is not limited to, random-access memory (RAM), read-only memory (ROM), electrically erasable programmable read-only memory (EEPROM), flash memory or other memory technology, compact disc read-only memory (CD-ROM), digital versatile disks (DVD) or other optical disk storage, magnetic cassettes, magnetic tape, magnetic disk storage or other magnetic storage devices, or any other tangible medium which can be used to store the desired information and which can be accessed by the processing system 500. In contrast to tangible processor-readable storage media, intangible processor-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, radio-frequency (RF), infrared (IR), and other wireless media.

Some embodiments may comprise an article of manufacture. An article of manufacture may comprise a tangible storage medium to store logic. Examples of a storage medium may include one or more types of processor-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (APIs), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled and/or interpreted programming language.

Some embodiments of the invention described herein are implemented as logical steps in one or more computer systems. The logical operations are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations described herein are referred to variously as operations, steps, objects, or modules. Furthermore, the logical operations may be performed in any order, adding or omitting operations as desired, unless explicitly claimed otherwise or a specific order is inherently necessitated by the claim language.

An example method for interpolating position with reference to a touch screen according to the presently disclosed technology comprises evaluating a position function to render a user's stroke on the touch screen, detecting one or more anomalies in the rendered stroke, adapting the position function to smooth the one or more detected anomalies, and evaluating the adapted stylus position function to render a subsequent stroke on the touch screen.

In another example method according to the presently disclosed technology, the rendered stroke and the subsequent stroke is that of a stylus.

In another example method according to the presently disclosed technology, the rendered stroke and the subsequent stroke is that of the user's finger.

In another example method according to the presently disclosed technology, the one or more anomalies are regularly repeating discontinuities in the user's stroke.

In another example method according to the presently disclosed technology, the adapting operation changes one or more coefficients of the position function.

Another example method according to the presently disclosed technology further comprises detecting one or more anomalies in the rendered subsequent stroke, further adapting the position function to smooth the one or more detected anomalies in the rendered subsequent stroke, and evaluating the further adapted position function to render another subsequent stroke on the touch screen.

In another example method according to the presently disclosed technology, the detecting, adapting, and evaluating operations are performed iteratively.

Another example method according to the presently disclosed technology further comprises comparing the adapted position function to one or more interpolation limits prior to evaluating the adapted position function.

Another example method according to the presently disclosed technology further comprises detecting a region of the touch screen where the user's stroke is rendered and selecting from a database the position function corresponding to the detected region of the touch screen.

Another example method according to the presently disclosed technology further comprises identifying an application the user is actively using when the user's stroke is rendered, wherein the adapting the position function is based on the identified application.

An example computing system according to the presently disclosed technology comprises a touch screen, a stylus, and a stylus position interpolation module. The stylus position interpolation module is configured to evaluate a stylus position function to render a user's stroke of the stylus on the touch screen, detect one or more anomalies in the rendered stroke of the stylus, adapt the stylus position function to smooth the one or more detected anomalies, and evaluate the adapted stylus position function to render a subsequent stroke of the stylus on the touch screen.

In another example computing system according to the presently disclosed technology, the one or more anomalies are regularly repeating discontinuities in the user's stroke of the stylus.

In another example computing system according to the presently disclosed technology, the adapting operation changes one or more coefficients of the stylus position function.

In another example computing system according to the presently disclosed technology, the stylus position interpolation module is further configured to detect one or more anomalies in the rendered subsequent stroke of the stylus, further adapt the stylus position function to smooth the one or more detected anomalies in the rendered subsequent stroke of the stylus, and evaluate the further adapted stylus position function to render another subsequent stroke of the stylus on the touch screen.

In another example computing system according to the presently disclosed technology, the detecting, adapting, and evaluating operations are performed iteratively.

In another example computing system according to the presently disclosed technology, the stylus position interpolation module is further configured to compare the adapted stylus function to one or more interpolation limits prior to evaluating the adapted stylus position function.

In another example computing system according to the presently disclosed technology, the stylus position interpolation module is further configured to detect a region of the touch screen where the user's stroke of the stylus is rendered, and select from a database the stylus position function corresponding to the detected region of the touch screen.

In another example computing system according to the presently disclosed technology, the stylus position interpolation module is further configured to identify an application the user is actively using when the user's stroke is rendered. The adapting the stylus position function is based on the identified application.

An example tangible processor-readable storage media embodied with instructions for executing on one or more processors and circuits of a device a process according to the presently disclosed technology comprising evaluating a stylus position function to render a user's stroke of a stylus on a touch screen, detecting one or more anomalies in the rendered stroke of the stylus, adapting the stylus position function to smooth the one or more detected anomalies, and evaluating the adapted stylus position function to render a subsequent stroke of the stylus on the touch screen.

Another example tangible processor-readable storage media embodied with instructions for executing on one or more processors and circuits of a device a process according to the presently disclosed technology further comprising detecting one or more anomalies in the rendered subsequent stroke of the stylus, further adapting the stylus position function to smooth the one or more detected anomalies in the rendered subsequent stroke of the stylus, evaluating the further adapted stylus position function to render another subsequent stroke of the stylus on the touch screen.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A method for interpolating position with reference to a touch screen comprising:
   evaluating a position function to render a user's stroke on the touch screen;
   detecting one or more anomalies in the rendered stroke;
   adapting the position function to change one or more coefficients of the position function and smooth the one or more detected anomalies; and
   evaluating the adapted position function to render a subsequent stroke on the touch screen, wherein the detecting, adapting, and evaluating operations are performed in real-time.

2. The method of claim 1 wherein the rendered stroke and the subsequent stroke are that of a stylus.

3. The method of claim 1 wherein the rendered stroke and the subsequent stroke are that of the user's finger.

4. The method of claim 1 wherein the one or more anomalies are regularly repeating discontinuities in the user's stroke.

5. The method of claim 1 further comprising:
   detecting one or more anomalies in the rendered subsequent stroke;
   further adapting the position function to smooth the one or more detected anomalies in the rendered subsequent stroke; and
   evaluating the further adapted position function to render another subsequent stroke on the touch screen.

6. The method of claim 1 wherein the detecting, adapting, and evaluating operations are performed iteratively.

7. The method of claim 1 further comprising:
comparing the adapted position function to one or more interpolation limits prior to evaluating the adapted position function.

8. The method of claim 1 further comprising:
detecting a region of the touch screen where the user's stroke is rendered; and
selecting from a database the position function corresponding to the detected region of the touch screen.

9. The method of claim 1 further comprising:
identifying an application the user is actively using when the user's stroke is rendered, wherein the adapting the position function is based on the identified application.

10. A computing system comprising:
a touch screen;
a stylus; and
a stylus position interpolation module configured to:
   evaluate a stylus position function to render a user's stroke of the stylus on the touch screen;
   detect one or more anomalies in the rendered stroke of the stylus;
   adapt the stylus position function to change one or more coefficients of the position function and smooth the one or more detected anomalies; and
   evaluate the adapted stylus position function to render a subsequent stroke of the stylus on the touch screen, wherein the detecting, adapting, and evaluating operations are performed in real-time.

11. The computing system of claim 10 wherein the one or more anomalies are regularly repeating discontinuities in the user's stroke of the stylus.

12. The computing system of claim 10 wherein the stylus position interpolation module is further configured to:
   detect one or more anomalies in the rendered subsequent stroke of the stylus;
   further adapt the stylus position function to smooth the one or more detected anomalies in the rendered subsequent stroke of the stylus; and
   evaluate the further adapted stylus position function to render another subsequent stroke of the stylus on the touch screen.

13. The computing system of claim 10 wherein the detecting, adapting, and evaluating operations are performed iteratively.

14. The computing system of claim 10 wherein the stylus position interpolation module is further configured to:
   compare the adapted stylus function to one or more interpolation limits prior to evaluating the adapted stylus position function.

15. The computing system of claim 10 wherein the stylus position interpolation module is further configured to:
   detect a region of the touch screen where the user's stroke of the stylus is rendered; and
   select from a database the stylus position function corresponding to the detected region of the touch screen.

16. The computing system of claim 10 wherein the stylus position interpolation module is further configured to:
   identify an application the user is actively using when the user's stroke is rendered, wherein the adapting the stylus position function is based on the identified application.

17. One or more tangible processor-readable storage media embodied with instructions for executing on one or more processors and circuits of a device a process comprising:
   evaluating a stylus position function to render a user's stroke of a stylus on a touch screen;
   detecting one or more anomalies in the rendered stroke of the stylus;
   adapting the stylus position function to change one or more coefficients of the position function and smooth the one or more detected anomalies; and
   evaluating the adapted stylus position function to render a subsequent stroke of the stylus on the touch screen, wherein the detecting, adapting, and evaluating operations are performed in real-time.

18. The one or more tangible processor-readable storage media of claim 17, wherein the process further comprises:
   detecting one or more anomalies in the rendered subsequent stroke of the stylus;
   further adapting the stylus position function to smooth the one or more detected anomalies in the rendered subsequent stroke of the stylus; and
   evaluating the further adapted stylus position function to render another subsequent stroke of the stylus on the touch screen.

* * * * *